Patented July 23, 1946

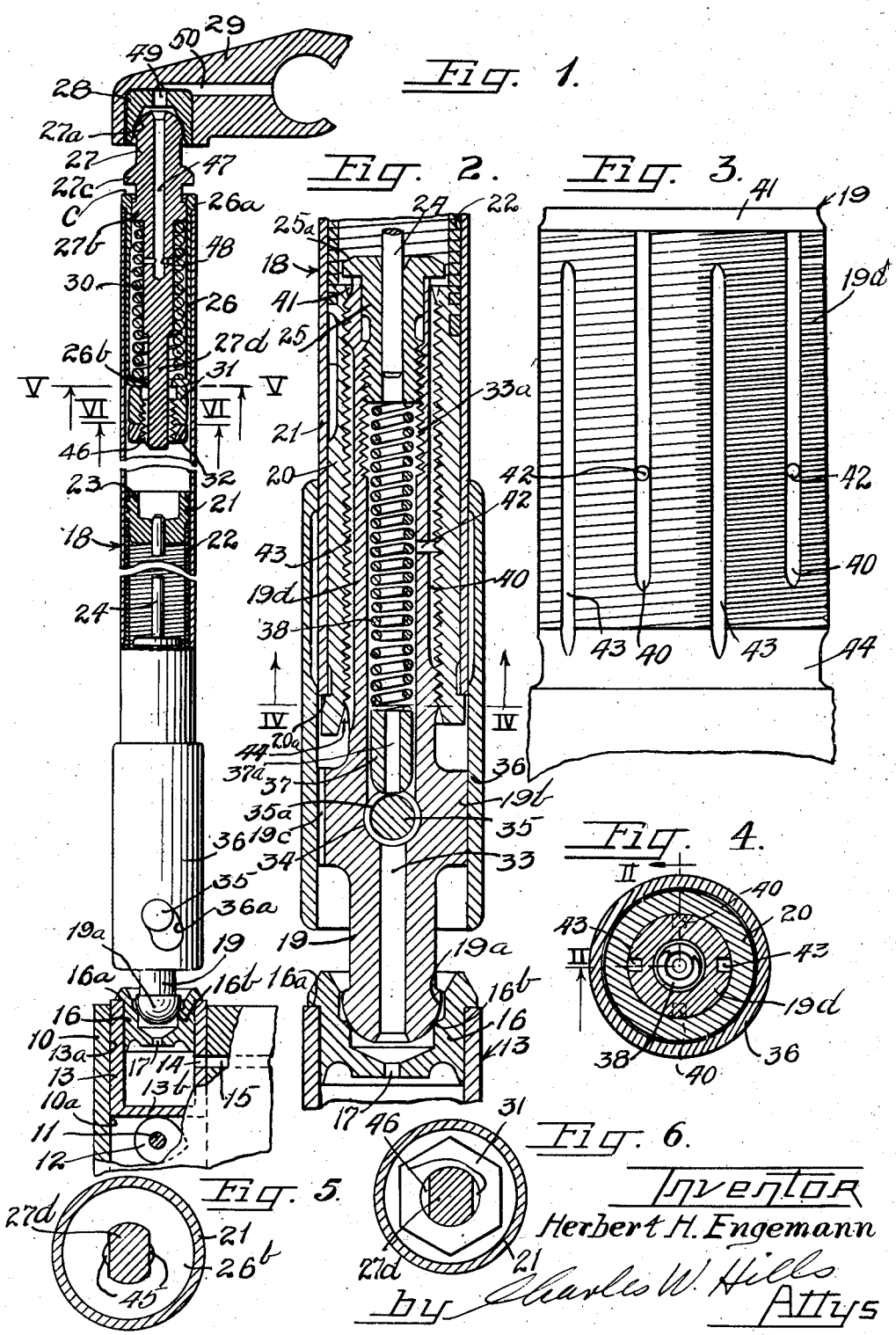

2,404,478

UNITED STATES PATENT OFFICE 2,404,478

SELF-CLEANING AND LUBRICATING VALVE TAPPET

Herbert H. Engemann, Cleveland Heights, Ohio

Application June 2, 1944, Serial No. 538,454

5 Claims. (Cl. 123—90)

This invention relates to a thread assembly especially adapted for take-up devices and particularly relates to a self-cleaning and self-lubricating thread assembly for automatic push rods.

The invention will be specifically hereinafter described in connection with an automatic push rod for a poppet valve linkage of an internal combustion engine, but it should be understood that the principles of this invention are broadly useful in many other devices.

In automatic push rods or tappet devices which transfer cam movements to poppet valves, it is desirable that automatic foreshortening or extension of the devices take place to compensate for expansion and contraction of the engine as well as for wear of the parts.

In accordance with this invention an automatic push rod has a stud member threaded into a nut which is impelled by a torsion spring to unscrew the nut from the stud thereby increasing the length of the push rod. An inertia hammer acts on the stud to thread the same into the nut for maintaining proper length of the push rod. The arrangement is such so that on the upstroke, or valve-opening stroke of the push rod, no change in rod length occurs, but the inertia hammer is caused to fly upwardly. On the downstroke the inertia hammer is caused to fly downwardly and immediately after the seating of the valve the inertia hammer strikes a pin on the stud to rotate the stud back into the nut against the bias of the torsion spring. After the inertia of the hammer is used up in effecting a momentary over shortening of the push rod, the torsion spring then becomes effective again to establish perfect adjustment before the next valve opening cycle, by unscrewing the stud member until all undesirable play is removed in the valve linkage.

In push rods of the type described above, it is essential that the threads of the stud and nut operate quite freely and this invention now provides an assembly which not only lubricates the threads but also continually washes the threads to eliminate foreign matter.

A feature of the invention includes lubrication of an automatic push rod and a rocker arm in a poppet valve linkage assembly from the cam follower in the assembly.

An object of the invention is to provide a thread assembly with lubricating grooves which serve to completely lubricate the threads and also wash out foreign matter from the threads.

Another object of the invention is to provide a thread assembly with a lubricant-metering device which not only lubricates the threads, but also supplies lubricant to adjacent structure.

A still further object of the invention is to provide an automatic push rod with lubricant passageways completely therethrough for lubricating all the parts thereof as well as for conveying lubricant to adjacent structure.

A still further object of the invention is to provide an automatic push rod for poppet valve assemblies wherein threaded-together parts have lubricant ducts metering lubricant to the threads and feeding lubricant to other parts.

Other and further objects of the invention will be apparent to those skilled in the art from the following detailed descriptions of the annexed sheet of drawings which illustrate one preferred embodiment of the invention.

On the drawing:

Figure 1 is a fragmentary broken side elevational view with parts in vertical cross section of a poppet valve linkage for an internal combustion engine including a push rod according to this invention.

Figure 2 is an enlarged fragmentary vertical cross-sectional view of the push rod of Figure 1, taken along the line II—II of Figure 4.

Figure 3 is an enlarged developed view of the threaded portion of the stud.

Figure 4 is a horizontal cross-sectional view taken along the line IV—IV of Figure 2.

Figure 5 is a horizontal cross-sectional view taken along the line V—V of Figure 1.

Figure 6 is a horizontal cross-sectional view taken along the line VI—VI of Figure 1.

As shown on the drawing:

In Figure 1 the reference numeral 10 designates generally a portion of an internal combustion engine such as the main body of the engine. A cam shaft 11 is provided in the engine and this shaft 11 carries a cam 12. The engine portion 10 has a bore 10a therein on which is slidably mounted the side wall 13a of a hollow cam follower 13. The cam follower 13 has a bottom wall 13b acted on by the cam 12 and an aperture 14 in the side wall 13a is adapted to be aligned with an oil duct 15 in the engine body 10 during each stroke of the follower. The open top of the follower 13 receives a ball cup 16 therein with a shoulder 16a bottomed on top of the cam follower and a seating face 16b therein.

The ball cup 16 has an aperture 17 in the bottom wall thereof connecting the interior of the cup with the interior of the cam follower 13 so that oil can flow from the cam follower into the ball cup.

A push rod 18 has a bottom stud 19 with a ball end 19a tiltably and rotatably seated on the bearing wall 16b of the ball cup 16. This stud 19, as best shown in Figure 2, has an enlarged cylindrical portion 19b in spaced relation from the ball end 19a thereof and a vertical groove 19c is provided through this enlarged portion 19b.

The stud also has a threaded shank portion 19d, extending from the enlarged portion 19b, threaded into an elongated nut 20. This nut 20 has a shoulder 20a at the bottom end thereof bottoming a tube 21. The tube 21 encases the nut 20 and a torsion spring 22 anchored at one end to the top end of the nut 20 and at the other end to an anchor 23 connected through a rod 24 with a bushing 25 which is threaded into the upper end of the stud portion 19d. The rod 24 is fixed to the bushing 25 and to the anchor 23.

The tube 21 also encases a spring cup member 26 which has a shoulder 26a bottomed on the upper end of the tube.

The cup 26 has an apertured bottom 26b. A top stud 27 projects axially from the top of the cup 26 and has a ball end 27a seated in a ball cup 28 which is carried in a rocker arm 29 for a poppet valve.

A spring 30 is disposed in the cup 26 and is bottomed on the cup bottom 26b to act against an enlarged cylindrical portion 27b of the top stud 27. The portion 27b is slidable in the cup 26.

A collar 27c is provided on the stud in spaced relation from the enlarged portion 27b and is adapted to be bottomed on the shoulder 26a of the cup.

The stud 27 has a reduced-diameter threaded portion 27d extending through the apertured bottom 26b of the cup and receiving, in threaded relation thereon, an adjustment nut 31 which thrusts against the cup bottom. A locking nut 32 cooperates with the adjusting nut 31 to hold the same in adjusted position.

The adjusting nut 31 holds the stud portion 27b in the cup 26 and determines the operating clearance C between the cup shoulder 26a and the collar 27c. The spring 30 is compressed when the push rod 18 is raised by the cam follower until the collar 27c strikes the shoulder 26a whereupon the push rod acts as a rigid member to rock the rocker arm 29 for opening the poppet valve.

The stud 19 is hollow and has an axial bore 33 therethrough. This bore is threaded at the upper end of the stud 19 as at 33a to receive in threaded relation therein the bushing 25. This bushing 25 has a head 25a bottomed on top of the stud 19 as shown.

The stud also has a transverse bore 34 through the enlarged portion 19b thereof intersecting the bore 33 and receiving a pin 35 therethrough. This pin 35 projects beyond the enlarged portion 19b into curved slots 36a of an inertia hammer 36 which is slidably mounted on the enlarged portion 19b and also on the lower end of the tube 21. The pin 35 has an annular groove 35a therearound disposed in the bore 33 and a hollow plunger 37 with a bore 37a therethrough is disposed in the bore 33 and spring-pressed into the groove 35a by a coil spring 38 held in the bore 33 by the bushing 25.

The push rod 18 is rotatably and tiltably mounted at its ends in the ball cups 16 and 28. The top stud 27 of the push rod is slidably mounted and is spring urged to provide an operating clearance gap C. The other stud 19 is threaded into the nut 20 but the torsion spring 22 anchored at one end on the nut 20 and at the other end on an anchor 23 carried on the rod 24 by the bushing 25 secured to the stud 19 tends to rotate the nut in an unscrewing direction for increasing the effective length of the push rod.

The inertia hammer 36 is slidably mounted on the push rod and on the enlarged portion 19b of the stud 19 and has slots 36a receiving the hammer pin 35 for driving this pin in a direction to cause the stud to be threaded into the nut for shortening the effective length of the push rod.

During the valve-opening stroke, the cam 12 raises the cam follower 13 and the push rod 18. During this upstroke the push rod 18 acts as a rigid member transmitting all movement of the cam follower to the rocker arm 29 except for that small amount of movement represented by the clearance space C. The spring 30 is weaker than the spring which holds the poppet valve in closed position, and therefore the rocker arm is not rocked by the force of the spring 35 and remains at rest until the operating clearance space C has been taken up.

During the last part of the upstroke, or valve-opening stroke, the push rod is decelerated and the inertia hammer 36 flies upwardly on the tube 21 to receive the pin 35 in the bottom of the slots 36a thereof. The impact of the bottom slot walls on the pin 35 is in an axially upward direction, and has no effect in rotating the pin.

On the downstroke, or valve-closing stroke, the cam 12 permits the cam follower 13 to drop and the valve spring tilts the rocker arm to closed position. The push rod 18 is thus moved downwardly and, during the first portion of this downward movement, the inertia hammer 36 remains in a raised position still retaining the pin in the bottoms of its slots due to inertia.

At about the half-way valve closed position the valve has reached its maximum downward velocity and the cam container begins to slow up the linkage to bring it to a stop at the fully closed valve position. When the push rod is decelerated on the downstroke the hammer 36 is free to continue downwardly at the maximum downward speed reached by the rod. As a result the inertia hammer 36 flies downwardly to strike the pin 35 with the walls at the top of the slots 36a. Since the top portions of the slots 36a are curved, the pin is given a rotative blow and threads the stud 19 into the nut 20 against the bias of the torsion spring 22. The length and curvature of the slots 36a are such that the poppet valve will first be completely closed and then the hammer will hit the pin to foreshorten the rod 18. Immediately after the hammer energy is spent the torsion spring 22 has ample time before the next valve opening cycle to unwind and lengthen the rod by screwing the stud outwardly of the nut for taking up undesired play in the linkage.

The spring 30 is used for permitting full seating of the valve after the rod 18 has been lengthened to accommodate expansion in a heated engine, and after the engine has been idle for an appreciable time and is cooled down without permitting the rod to be foreshortened. For example, stopping of a hot engine with the rod 18 in lengthened position would result in the rod holding the valve in opened position when the engine had cooled down and the parts contracted to move the rocker arm closer to the valve body. However, the spring 30 will be compressed and the operating clearance space C will be taken up so that the valve will remain fully closed.

In the operation of the push rod 18, it is highly important that the threaded connection between the stud 19 and the nut 20 be free acting. This is accomplished in the present invention by insuring adequate lubrication of the threads as well as washing out of any foreign matter which might be deposited on the threads.

The threaded shank portion 19d of the stud 19, as shown in Figures 2 to 4, has a pair of diametrically opposed longitudinal slots 40 extending from a level which is several thread turns above the bottom of the threads, as best shown in the section of Figure 2 and the developed view of Figure 3. These grooves 40 extend through the upper ends of the threads and communicate freely with an annular trough 41 provided between the upper end of the stud portion and the upper end of the nut 20.

Holes 42 through the threaded shank portion 19d of the stud connect the bore 33 with the groove 40 preferably closer to the closed bottom ends of the grooves 40 than to the open top ends of the grooves 40.

The threaded shank portion 19d of the stud 19 also has a pair of diametrically opposed longitudinal grooves 43 between the grooves 40 and these grooves 43 extend through the bottom threads into a trough or annular space 44 provided between the lower end of the nut 20 and the unthreaded portion of the stud shank which extends between the nut and the enlarged portion 19b. The upper ends of the grooves 43 terminate beneath the trough or groove 41 and several turns of thread overlie the ends of these grooves.

As shown in Figures 1 and 5, the portion 27d of the top stud 27 has flat side walls projecting through the apertured bottom 26b of the cup 26. However, relieved portions 45 are provided in the bottom wall 26b adjacent the flat side walls to cooperate therewith for defining oil grooves.

As shown in Figures 1 and 6, the flat sides of the stud portion 27d cooperate with the nuts 31 and 32 to provide oil grooves or passageways 46.

The shank portion of the stud 27 above the threaded end 27d, as best shown in Figure 1, has an axial bore 47 therethrough communicating at its lower end through holes 48 with the interior of the cup 26. The open top of the bore 47 communicates with the ball cup 28.

The ball cup 28 has a lubricant bore 49 therethrough communicating with a bore 50 in the rocker arm 29.

Lubricant supplied from the bore 15 of the engine body 10 enters the cam follower 13 and flows upwardly through the hole 17 in the ball cup 16 and thence through the bore 33 of the stud 19 around the groove 35a of the pin 35, through the bore 37a of the plunger 37 and through the holes 42 into the grooves 40. Some of the oil from these grooves 40 will flow radially around the thread in the threaded shank portion 19d to lubricate the thread and to wash any impurities thereon into the grooves 43. The grooves 43 receive oil from the thread and discharge this oil into the space 44 from which oil can flow through the notch or groove 19c in the enlarged portion 19b of the stud for lubricating the inertia hammer 36.

Oil from the grooves 40 also passes into the trough 41 at the top of these grooves and lubricates the torsion spring 22. Some of the oil passes through the passageways 46 between the stud shank 27d and the nuts 31 and 32 and thence through the passageways 45 into the cup 26. Oil from the cup 26 passes through the holes 48 into the bore 47 of the stud 27. From this bore 47 oil can flow into the ball cup 28 for lubricating the surfaces thereof and thence through the bore 49 into the bore 50 for lubricating the bearing of the rocker arm 29.

From the above descriptions it will be understood that this invention includes a self-lubricating and cleaning thread assembly especially adapted for extensible and contractable link members such as automatic push rods. The oil grooves in the threaded portion 19d of the stud 19 can be in diametrically opposed pairs as illustrated, or any number of grooves can be disposed at spaced intervals around the periphery of the stud shank. Conversely the grooves could be provided in the threaded inner surface of the nut 20 with the same result.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A self-cleaning and self-lubricating thread assembly comprising threaded-together male and female members, one of said threaded-together members having a first longitudinal groove therein opening at one end of the assembly together with a second groove opening at the other end of the assembly, means defining a passageway for conveying oil to one of said grooves intermediate the ends thereof whereby some of said oil will flow along the threads to the other of said grooves for washing and lubricating the threads and oil will flow out of the open end of both grooves.

2. A self-cleaning and self-lubricating thread assembly comprising threaded-together male and female members, said male member having an axial passageway therein and a radial passageway communicating with said axial passageway, one of said male and female members having a longitudinal groove in the threaded portion thereof communicating with said radial passageway and opening at one end only of the assembly, and one of said members having a second groove in the threaded face thereof spaced from the first groove and opening at the other end of the assembly, said axial passageway in the male member adapted to supply lubricant through the radial passageway into the first mentioned groove for circulation over the threads into the second groove.

3. A linkage comprising threaded-together male and female parts, one of said parts having a plurality of longitudinal grooves in the threaded portion thereof, each of said grooves opening at only one end of the assembled parts, adjacent grooves having their respective openings at opposite ends of the assembly, and means for introducing lubricant to a groove for flow along the threads to an adjacent groove to be discharged from the end of the adjacent groove.

4. A valve linkage comprising threaded-together parts, a torsion spring for urging said parts in opposite directions to elongate the assembly, a cam follower acting on one of said parts, said cam follower and said one part having communicating oil passageways therein, a plurality of longitudinal grooves in the threaded portion of one of said threaded together parts, each of said grooves opening at only one end of the assembled parts, adjacent grooves having their respective openings at opposite ends of the assembled parts, and means connecting said oil passageways with said grooves for lubrication of the threads, and means associated with the open ends of said grooves for receiving lubricant and occluded matter from the threads.

5. In a valve linkage a cam follower, a ball cup carried by the cam follower, a push rod having a ball ended stud seated in said ball cup, said stud having a threaded shank portion, a nut threaded on said threaded shank portion, a torsion spring acting on said nut and said stud for lengthening the assembly, a tube housing said nut, a cup seated in the upper end of said tube, a spring-urged ball ended stud carried by said cup, a rocker arm having a ball seat receiving the ball end of said spring urged stud, said ball cup arranged to receive oil from said cam follower, said stud seated in said ball cup having an oil passageway therethrough, said oil passageway in the stud having bleeder passageways associated therewith, said threaded portions of the stud and nut having oil-distributing grooves communicating with said bleeder passageways and with the interior of the tube, said cup in the top end of the tube arranged to receive oil from the tube, said spring-urged stud having oil passages associated therewith adapted to receive oil from the cup, and said seat in said rocker arm having an oil passage receiving oil from the spring-pressed stud to lubricate the rocker arm.

HERBERT H. ENGEMANN.